Oct. 3, 1967 S. W. NICK 3,345,013

TAPE SPACER DEVICE FOR AN ENDLESS TAPE REEL

Filed April 7, 1966 2 Sheets-Sheet 1

INVENTOR
STANLEY W. NICK

BY
[signature]

Oct. 3, 1967 S. W. NICK 3,345,013

TAPE SPACER DEVICE FOR AN ENDLESS TAPE REEL

Filed April 7, 1966 2 Sheets-Sheet 2

INVENTOR

STANLEY W. NICK

BY W. Robert Hudson 3,345,013
Patented Oct. 3, 1967

3,345,013

TAPE SPACER DEVICE FOR AN ENDLESS TAPE REEL

Stanley W. Nick, 2506 S. 35th Ave.,
Omaha, Nebr. 68105

Filed Apr. 7, 1966, Ser. No. 540,959
5 Claims. (Cl. 242—71.8)

ABSTRACT OF THE DISCLOSURE

This invention pertains to a device for establishing a predetermined space between adjacent coils of an endless tape that has been placed on a reel. The device includes a hub having a rim, about which is wound the tape, and a flange formed on the periphery of the hub on which the tape is supported; and a movable spacer hub adapted to be placed relative to the hub and operable to space the innermost coil of the tape a certain distance from the rim. Upon removing the movable spacer hub and cementing the ends of the tape together in an endless belt the tape will have a proper air gap between each coil thus allowing for the simultaneous removal of tape from the center of the coil and the replacement of the tape on the outside of the coil.

This invention relates to a magnetized tape winding apparatus, and more particularly to a tape spacer device for providing a predetermined space between the coils of a tape wound about a substantially conventional tape holder for subsequent use, for example, in a commercially available tape recorder.

A recent innovation in the tape playing equipment field is the cartridge-loaded tape player. A tape holder, rotatably mounted in a cartridge, is employed having a continuous or endless tape coiled thereon. In operation the tape is unreeled from the center of the coil wound about the hub, and reeled back on the outside of the coil. The outer circumference of the coiled tape is larger than the inner circumference, therefore for each rotation of the tape holder more than one coil of the tape must be unreeled. To accomplish the art of reeling one coil on the tape holder and simultaneously removing more than one coil from the center thereof during one revolution, it is necessary for each coil therebetween to slide relative to the coils adjacent thereto. Therefore it is necessary, when placing the tape on the tape holder, to provide a certain amount of distance or air gap between each coil, which is herein referred to as spacing of the tape.

If the tape is tightly wound on the tape holder the coils will not be able to slide relative to each other and one revolution of the tape holder will not provide a sufficient length of unreeled tape to allow replacement on the outer coil, thereby either causing the tape to part or to cause the driving mechanism to slide on the tape. By providing insufficient spacing, or too much slack, the tape player will unreel more than the equivalent of one outer coil during a revolution of the tape holder, thus possibly jamming the player with unreeled tape. Improper spacing can also cause excess wear on the tape and deteriorate the quality of the sound recorded thereon.

The processor or recording company preparing the tapes presently process the tape in the following manner. A master tape is prepared and placed on a master player machine. The tape is generally wound thereon with the end of the tape having the last portion of the recording positioned to be played first, or wound backwards. Connected to the master player are a number of duplicating machines thus allowing many duplicated tapes to be prepared each time the master tape is played.

The duplicator machine is provided with two turntables, one for holding a first tape holder having blank tape, and the other for holding a tape holder, hereinafter referred to as an intermediate tape holder, to receive the tape from the first tape holder after the sound has been impressed on the tape. As the master tape is played backward, the duplicated tape is wound about the intermediate tape holder. As the last recorded portion is wound first about the intermediate holder, the first part of the recording is therefore on the outer coils. This process occurs at a spaced considerably greater than that at which the duplicated tape will be played by the player operated by the ultimate user.

When the process is completed, the intermediate tape holder containing the impressed tape is removed from the duplicator and the tape thereon is transferred to a third tape holder which is ultimately placed in the cartridge. The hub of this third tape holder has either an inverted frusto-conical rim in cross section, or a V-type pulley in cross section, thus facilitating unreeling from the center of the coil. The tape is now wound with the first part of the recording on the inner placed coils. It is then necessary to remove a number of the inner coils to provide the required, hereinbefore designated air gap, thus properly spacing the tape.

Although the operator is trained, he or she can only determine the proper spacing by a combined mental and manual process of "feel." When the operator has decided that the tension is correct, the amount of tape unwound is removed by being cut off. The inner and outer ends of the tape are then cemented together to provide an endless tape. Improper spacing obviously requires rejection of the tape.

It should be noted that the cartridge-loaded tape holder, having a frusto-conical or triangular shaped rim, can not be loaded directly at high speed because the first coils of tape wound thereabout will tend to jam against and under the rim. This jamming prevents removal of the inner coils for tensioning and for cementing of the two ends together to provide an endless tape.

It is therefore an object of this invention to provide a tape spacer device which automatically imposes proper spacing on magnetized tape as it is wound on a substantially conventional tape holder.

Another object of this invention is the provision of a tape spacer device wherein a substantially conventional tape holder can be wound on a duplicating machine at high speed and with the proper tension placed thereon.

It is a further object of this invention to provide a tape spacer device that substantially reduces the amount of tape wasted during the duplicating process.

Yet another object of this invention is the provision of a tape spacer device which substantially reduces the time required to process a tape.

Yet a further object of this invention is to provide a device for use on a conventional duplicating machine for winding tape on a substantially conventional tape holder which does not require any particular skill to operate.

Still another object of this invention is the provision of a tape spacer device which is economical to manufacture, functional in use and appearance, and simple but rugged in construction.

These objects, and other features and advantages of this invention will become more readily apparent upon reference to the following description, when taken in conjunction with the accompanying drawings, wherein.

Figure 1:
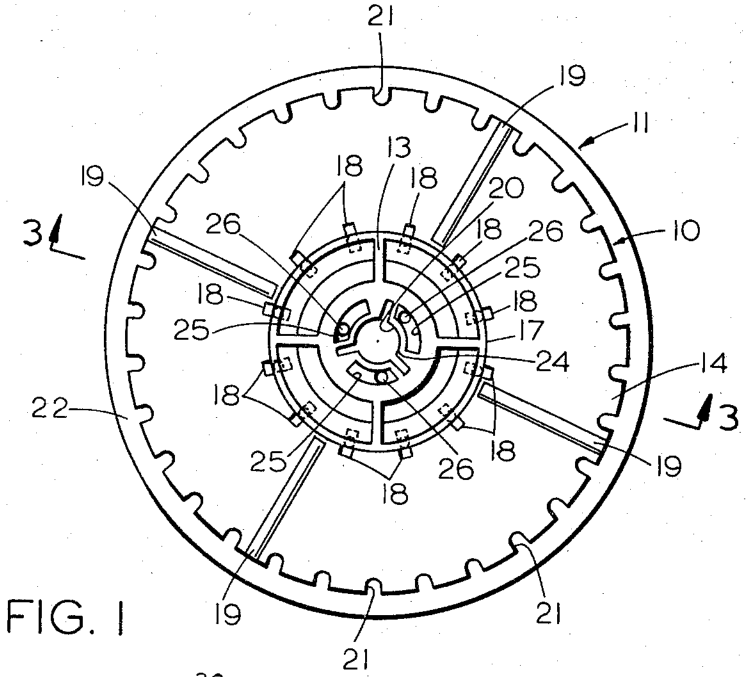
FIG. 1 is a top plan view of the combined tape holder and tape spacer device of this invention.

Referring now to the drawings, the invention comprises a tape holder 10 (FIG. 1) removably disposed on a tape spacer device indicated generally at 11. The tape holder 10 is adapted to contain a tape 12 (FIG. 2) wound thereabout in a conventional manner.

Figure 2:
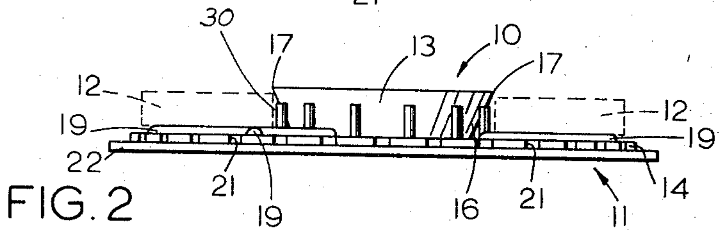
FIG. 2 is a side plan view thereof.
Figure 3:
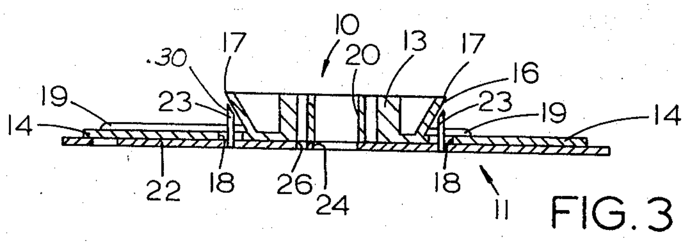
FIG. 3 is a sectional view taken along the line 3—3 in FIG. 1.

More specifically, the tape holder 10 comprises a hub 13 having a rim 16 mounted centrally on a circular, flat flange 14, as best shown in FIGS. 1 and 3. The outer wall surface of the rim 16 of the hub 13 has an inverted frustro-conical shape. The diameter of the rim 16 at the upper peripheral edge 17 should always be greater than the diameter of the rim 16 at its junction with the flange 14, so as to guide the tape as it is removed from the tape holder 10.

Figure 4:
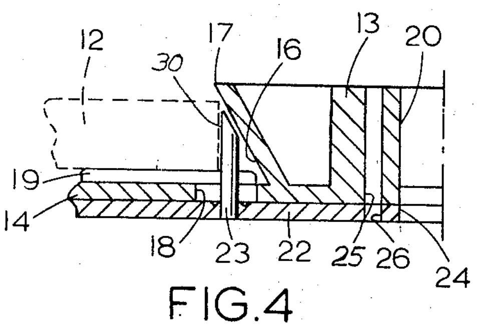
FIG. 4 is an enlarged fragmentary view of a detail of FIG. 3.

A plurality of arcuately spaced openings 18 (FIGS. 1 and 4) are formed in the flange 14 concentrically about the center of the hub 13. Referring to FIGS. 1 and 3, it will be seen that at least a portion of the openings 18 are disposed directly below the upper edge 17. A plurality of arcuately spaced, radially extended, ridges 19 are formed on the upper surface of the flange 14 to reduce friction and wear on the tape 12 normally disposed thereon. Formed on the periphery of the flange 14, are a plurality of arcuately spaced indents 21.

A three pronged slot 20 is formed centrally in the holder 10 for engagement with a complementary spindle (not shown) on a dupicating machine turntable. A plurality, namely three, arcuately spaced openings 25 (FIGS. 1 and 4) are formed in the holder 10 concentrically about the slot 20.

The tape spacer device 11 (FIG. 3) comprises a flat circular plate 22 having a plurality of arcuately spaced upstanding projections or prongs 23 mounted thereon. The prongs 23 form a concentric ring about the center of the plate 22. Upon placing the tape holder 10 downwardly upon the plate 11, the prongs 23 align with the openings 18 so as to slide through the openings 18 and project upwardly therethrough, thus providing in effect a temporary second rim 30 on which the tape is wound. Importantly, this temporary rim 30 is disposed normal to the plane of the flange 14 in the manner of a conventional rim about which tape can be wound at a high speed.

Axially drilled through the center of the plate 22 (FIG. 3) is a hole 24, and a trio of arcuately spaced openings 25 (FIG. 1) formed concentrically about the hole 24. The turntable of a duplicating machine (not shown) has a shaft and a plurality of projections 26 extending outwardly therefrom. The hole 24 and the openings 25 are adapted to slide over the shaft and projections thereby, in effect, locking the plate to the turntable.

Figure 5:
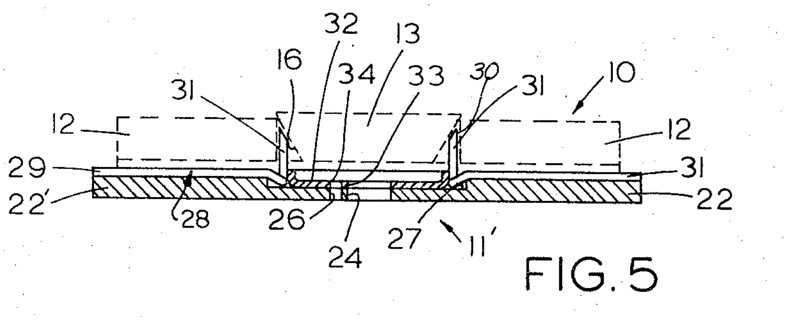
FIG. 5 is a sectional view similar to FIG. 3 of a modification of the tape spacer device with the tape holder and tape shown in phantom.
Figure 7:
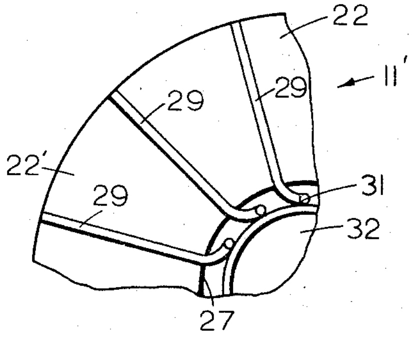
FIG. 7 is a fragmentary top plan view of the FIG. 5 modification.
Figure 6:
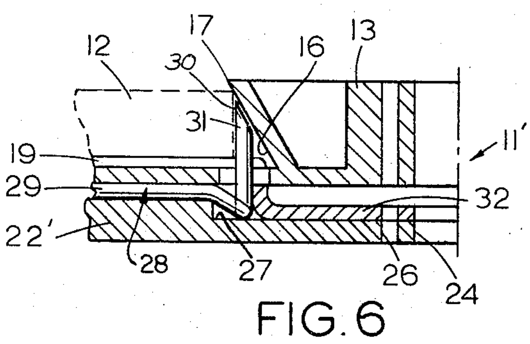
FIG. 6 is a greatly enlarged fragmentary view of a detail of FIG. 5, with a tape holder placed thereon.

For each length of the tape wound on a tape holder it is necessary to provide a given amount of space between adjacent coils. Under these circumstances, instead of providing a separate tape spacer device 11 for each different length of tape, a modified embodiment of the tape spacer device 11 is shown in FIGS. 5, 6 and 7. The device 11′ is provided with prongs 31 which can be adjusted as to their radial location relative to the hub 13, wherein the air gap between each coil can be varied. Parts which are identical to those described in the FIGS. 1–4 embodiment are identified with like reference numerals.

The upper surface of the plate 22′ is provided with a circular cavity 27 formed at the center thereof as best shown in FIG. 5. A plurality of arcuately spaced substantially L-shaped wires 28 are radially disposed on the plate, with one leg 29 thereof secured to the face of the plate 22′ and with the other leg 31 projecting upwardly therefrom to form a prong comparable to the prong 23. The radial distance of each prong 31 from the center of the plate can be adjusted by inserting a circular, dish-shaped disk 32 into the cavity 27.

Referring to FIG. 7, it is seen that each upstanding prong 31 is bent at the base thereof at an angle offset from the leg 29, enabling thereby the prong 31 to be flexed into an angle relative to the leg 29 more acute than that illustrated in FIG. 7. Disks 32 having different diameters, upon being inserted into the cavity 27, thereby provide different spacings between the prongs 31 and the rim 16. Each disk 32 is also provided with a hole 33 and a trio of openings 34 formed therein, corresponding to the hole 24 and the openings 26 in the plate 22, for locking the plate 22 and the tape holder 10 to the turntable.

In operation, the tape spacer device 11 is placed on, or built into, the turntable receiving the recorded tape of the duplicator machine. The master tape is wound in a manner wherein the tape is played from beginning to end. The turntable receiving the blank tape is loaded and the tape threaded through the recording device to the tape holder 10 placed on the tape spacer device 11. Upon impressing the sound from the master tape onto the blank tape, and winding it onto the tape holder 10, the tape-holder is removed from the tape spacer device 11. The inner coil of tape is unreeled and the end thereof cemented or secured to the opposite end. The endless tape and tape holder 10 are then inserted into the cartridge, and packaged for delivery to the ultimate user.

Prior to the development of the tape spacer device, as discussed hereinbefore, it was necessary to wind the recorded tape onto an intermediate tape holder, transfer the tape to the cartridge tape holder 10, manually remove the innermost coils of the tape to provide proper spacing between adjacent coils according to the feel, discard the removed tape, cement the ends to form an endless coil and install the tape holder 10 in the cartridge.

Utilization of the tape spacer device described herein therefore eliminates the stage of placing the recorded tape on an intermediate tape holder, transferring the tape to the tape holder 11, removing many inner coils to manually space the tape, and the discarding of the unwound tape.

Although a preferred embodiment of this invention has been described and disclosed hereinbefore, it is to be remembered that various modifications and alternate constructions can be made thereto without departing from the true spirit and scope of the invention as defined in the appended claims.

I claim:

1. In an apparatus for winding a tape, a tape spacer device for providing a predetermined space between adjacent coils of the tape comprising in combination:

a tape holder including a hub having a rim and with a flange formed on the periphery of said hub, said flange adapted to be placed on a turntable and said tape holder adapted to contain a tape wound thereabout in a conventional manner; and movable spacer means adapted to be placed relative to said hub;

said spacer means including a plate means, said plate means having a plurality of arcuately spaced projections mounted thereon operable to space the innermost coil of the tape a certain distance from said rim.

2. A tape spacer device as defined in claim 1, and further wherein said flange has a plurality of arcuately spaced openings formed therethrough adapted to receive said projections.

3. A tape spacer device as defined in claim 2, and further wherein said plate means is adapted to be mounted on a turntable and said tape holder is removably disposed on said plate means with said projections extending through said openings, said projections providing a second rim for receiving the tape in a conventional manner.

4. A tape spacer device as defined in claim 3, and further wherein said second rim is substantially normal to said flange.

5. A tape spacer device as defined in claim 4, and further wherein said second rim is radially adjustable as to its location relative to said rim.

References Cited

UNITED STATES PATENTS

| | | | |
|---|---|---|---|
| 1,337,418 | 4/1920 | Tuttle ------------ | 242—55.18 |
| 2,831,680 | 4/1958 | Rookus. | |

FRANK J. COHEN, *Primary Examiner.*

N. L. MINTZ, *Assistant Examiner.*